US009437868B2

United States Patent
Buehler et al.

(10) Patent No.: US 9,437,868 B2
(45) Date of Patent: Sep. 6, 2016

(54) IRON (III) ORTHOPHOSPHATE-CARBON COMPOSITE (75) Inventors: Gunnar Buehler, Nickenich (DE); Killian Schwarz, Mainz (DE); Andreas Jazdanian, Dieburg (DE); Christian Graf, Mainz (DE); Michael Rapphahn, Eschborn (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 289 days.

(21) Appl. No.: 13/981,369

(22) PCT Filed: Jan. 23, 2012

(86) PCT No.: PCT/EP2012/050926
§ 371 (c)(1),
(2), (4) Date: Dec. 4, 2013

(87) PCT Pub. No.: WO2012/101071
PCT Pub. Date: Aug. 2, 2012

(65) Prior Publication Data
US 2014/0145120 A1     May 29, 2014

(30) Foreign Application Priority Data
Jan. 25, 2011   (DE) .................. 10 2011 003 125

(51) Int. Cl.
H01M 4/36    (2006.01)
B82Y 30/00   (2011.01)
(Continued)

(52) U.S. Cl.
CPC .............. *H01M 4/364* (2013.01); *B82Y 30/00* (2013.01); *C01B 25/375* (2013.01); *C01B 25/45* (2013.01);
(Continued)

(58) Field of Classification Search
CPC .. H01M 4/364; H01M 4/131; H01M 4/5825; H01M 4/625; H01M 10/0525; B82Y 30/00; C01B 25/375; C01B 25/45; C01B 25/26; C01P 2002/00; C01P 2002/72; C01P 2002/85; C01P 2004/03; C01P 2004/62; C01P 2004/64; C01P 2006/12; C01P 2006/40; C01G 49/00
USPC ...... 252/500, 506, 182.1; 429/221; 423/140, 423/311
See application file for complete search history.

(56) References Cited

U.S. PATENT DOCUMENTS 6,855,273 B2   2/2005   Ravet et al.
7,338,647 B2   3/2008   Huang et al.
(Continued)

FOREIGN PATENT DOCUMENTS

CN    1805181 A      7/2006
CN    101237043 A    8/2008
(Continued)

OTHER PUBLICATIONS

JP Office Action dated Feb. 24, 2015.
(Continued)

*Primary Examiner* — Mark Kopec
*Assistant Examiner* — Danny N Kang
(74) *Attorney, Agent, or Firm* — Michael L. Dunn (57) ABSTRACT

A method for producing an iron(III)orthophosphate-carbon composite which contains iron(III)orthophosphate of the general formula $FePO_4 \times nH_2O$ ($n \leq 2.5$), a carbon source being dispersed in a phosphoric aqueous $Fe^{2+}$ ion-containing solution and orthophosphate-carbon composite being precipitated and removed from the aqueous solution when an oxidant is added to the dispersion.

36 Claims, 8 Drawing Sheets (51) Int. Cl.
    *C01B 25/37*     (2006.01)
    *H01M 4/131*     (2010.01)
    *H01M 4/1391*     (2010.01)
    *H01M 4/58*     (2010.01)
    *H01M 4/62*     (2006.01)
    *H01M 10/0525*     (2010.01)
    *C01B 25/45*     (2006.01)

(52) U.S. Cl.
    CPC ........... *H01M 4/131* (2013.01); *H01M 4/1391* (2013.01); *H01M 4/5825* (2013.01); *H01M 4/625* (2013.01); *H01M 10/0525* (2013.01); *C01P 2002/72* (2013.01); *C01P 2002/85* (2013.01); *C01P 2004/03* (2013.01); *C01P 2004/62* (2013.01); *C01P 2004/64* (2013.01); *C01P 2006/12* (2013.01); *C01P 2006/40* (2013.01); *Y02E 60/122* (2013.01); *Y02P 70/54* (2015.11)

(56) References Cited

U.S. PATENT DOCUMENTS

| | | | |
|---|---|---|---|
| 7,498,098 | B2 | 3/2009 | Okada et al. |
| 2002/0195591 | A1 | 12/2002 | Ravet et al. |
| 2003/0064287 | A1* | 4/2003 | Masquelier ........... C01B 25/375 429/221 |
| 2005/0260494 | A1 | 11/2005 | Huang et al. |
| 2006/0127750 | A1 | 6/2006 | Okada et al. |
| 2007/0134554 | A1 | 6/2007 | Armand et al. |
| 2009/0152512 | A1 | 6/2009 | Liaw et al. |
| 2009/0311597 | A1 | 12/2009 | Chiang et al. |
| 2010/0065787 | A1 | 3/2010 | Armand et al. |
| 2011/0117003 | A1* | 5/2011 | Wissemborski ...... C01B 25/375 423/306 |

FOREIGN PATENT DOCUMENTS

| | | |
|---|---|---|
| CN | 101337666 A * | 1/2009 |
| CN | 101752561 A | 6/2010 |
| DE | 102007049757 A1 | 4/2009 |
| DE | 102007058674 A1 | 7/2009 |
| DE | 102009001204 A1 | 9/2010 |
| EP | 1094532 A1 | 4/2001 |
| EP | 1553648 A1 | 7/2005 |
| JP | 2005-123107 A | 5/2005 |
| JP | 2011-500492 A | 1/2011 |
| WO | 2010/106035 A2 | 9/2010 |
| WO | 2010097341 A1 | 9/2010 |
| WO | WO 2010106035 A2 * | 9/2010 |

OTHER PUBLICATIONS

CN Office Action dated Sep. 5, 2014.
Dragana Jugovic, Dragan Uskokovic: A review of recent developments in the synthesis procedures of lithium iron phosphate powders. In: Journal of Power Sources, 190, 2009,538-544.
International Preliminary Report on Patentability from corresponding PCT/EP2012/050926.

* cited by examiner

Fig. 1a: Scanning electron microscope image of an iron(III) orthophosphate with a metastrengite I crystal structure produced according to the prior art from Fe(II)SO$_4$ with phosphoric acid.

Fig. 1b: X-ray diffraction spectrum of the iron(III) orthophosphate of Fig. 1a.

Fig. 2a: Scanning electron microscope image of iron(III) orthophosphate produced from Fe₃O₄ according to DE 10 2009 001 204 A1, which exists predominantly in the metastrengite II crystal structre.

Fig. 2b: X-ray diffraction spectrum of the iron(III) orthophosphate of Fig. 2a.

Figs. 3a-e: Scanning electron microscope images of iron(III) orthophosphate-carbon composite at different sample positions and magnifications. Particles of FOP and graphite cannot be differentiated. The sample was prepared from a washed filter cake of FOP/C by dispersion in $H_2O$.

Fig. 4: Powder diffraction diagram (CuKα radiation) of a typical iron(III) orthophosphate-carbon composite (black: measured diffraction pattern; red: ICSD reference data for phosphosiderite (ICSD# 076-0451); blue: ICSD reference data for graphite (ICSD# 075-2078)).

Fig. 5: EDX analysis of a FOP/C according to the invention. The spectrum shows a pronounced peak for the C-Kα line and also for all otherwise expected elements. The Si-K-α line is due to the sample carrier, since the FOP/C was applied to a silicon wafer. An element mapping (not shown) shows that carbon is homogeneously distributed over the whole sample. An elementary analysis (CHN) showed a C content of the sample of 3.98 wt.%.

Fig. 6: EDX analysis of a further FOP/C according to the invention. The spectrum shows a pronounced peak for the C-Kα line and also for all otherwise expected elements. The Si-Kα line is due to the sample carrier, since the FOP/C was applied to a silicon wafer. The Au-lines are due to gold particles with which the sample was sputtered before the measurement, in order to avoid charge effects. An element mapping (not shown) shows a homogeneous distribution of P and Fe. C has a higher concentration roughly in the middle of the sample, which indicates the presence of an individual particle. An elementary analysis (CHN) gave a C content of the sample of 3.91 wt.%.

IRON (III) ORTHOPHOSPHATE-CARBON COMPOSITE

CROSS REFERENCE TO RELATED APPLICATIONS

This is a United States Nationalization of International Patent Application PCT/EP2012/050926 filed Jan. 23, 2012 which claims priority from German Patent Application 10 2011 003 125.1 filed Jan. 25, 2011.

BACKGROUND OF THE INVENTION

The present invention relates to a simple and cost-effective method for producing iron(III) orthophosphate-carbon composites (FOP/C) with a high electrical conductivity, iron(III) orthophosphate-carbon composites produced according to the method, as well as their use for the production of $LiFePO_4$ cathode materials for Li-ion batteries.

Rechargeable Li-ion batteries are widely used energy storage means, in particular in the mobile electronics sector, since the Li-ion battery is characterised by a high energy density and can supply a high rated voltage, so that the Li-ion battery with a comparable performance is significantly smaller and lighter than conventional batteries. Spinels such as $LiCoO_2$, $LiNiO_2$, $LiNi_{1-x}Co_xO_2$ and $LiMn_nO_4$ have proved to be suitable as cathode materials. In order to increase the safety of the Li-ion batteries, especially with regard to a thermal overloading during operation, $LiFePO_4$ was developed as a cathode material. This material is characterised by a good performance, high specific capacity and also high thermal stability in operation. Iron orthophosphate is a starting material for the production of $LiFePO_4$ cathode material for Li-ion batteries.

High demands in terms of purity are placed on the cathode material of Li-ion batteries, since any contamination that may involve undesirable redox reactions during operation (charging and discharging) has a deleterious effect on the performance of the battery. The nature and concentration of the possible contaminations basically depends on the quality of the raw materials used for the production of the cathode material and their production processes per se. In the production process of the cathode material measures can be adopted for the subsequent reduction of impurities, which however is generally associated with an increase in production costs. It is therefore desirable to use starting materials and raw materials that are as pure as possible for the production of the cathode material. Apart from the purity of the starting materials, their structure and morphology also have a significant influence on the quality of the cathode material produced therefrom.

DE 10 2009 001 204 A1 describes the production of crystalline iron(III) orthophosphate (FOP) in the form of phosphosiderite crystallites (metastrengite II crystallites) with a particular morphology and purity. On account of the particular purity and the novel material properties this iron(III) orthophosphate (FOP) is particularly suitable as a starting material for the production of lithium-iron phosphate ($LiFePO_4$; LFP) for lithium ion batteries, for example according to the methods described in US 2010/0065787 A1.

Pure lithium-iron phosphate (LFP) has a poor electrical conductivity, which is why it can only be used to a limited extent in its pure form as a cathode material. Various approaches have therefore been developed in order to improve the electrical conductivity of lithium-iron phosphate.

U.S. Pat. No. 6,855,273 B2 and US 2010/0065787 A1 describe the production of a carbon coating on the LFP particles, in which a synthesised LFP or a mixture of precursor compounds, inter alia FOP, is mixed with organic materials, generally oligopolymers or polymers, and is then heated for several hours at temperatures around 700° to 800° C. in order to effect a carbonisation of the organic component on the surface of the LFP particles. If no graphitisation is thereby achieved, this can have a negative effect on the electrical conductivity of the cathode material, since only graphitic structures ensure a high electrical conductivity. The process parameters of this thermal process have to be strictly controlled, which is complicated. Also, the carbon precursor compounds required for the formation of the coating have to be chosen so as to match the process exactly. A further disadvantage is that the carbon precursor compounds have to be added in excess in relation to the carbon fraction remaining in the end product, since a part of the precursor compounds is lost in the form of thermal decomposition products. The exact adjustment and reproduction of the carbon and graphite content is complicated on account of the process.

Another disadvantage of this method is that in the thermal process a temperature of at least 650° C. must be achieved in order to carbonise and graphitise an organic carbon precursor compound. At such high temperatures it is virtually impossible to prevent a pronounced particle growth and a caking of the calcination material. However, this in particular should be avoided in the production of LFP, in order to keep the diffusion paths for the Li ions short.

US 2009/0311597 A1 describes the doping of LFP with different transition metals or transition metal compounds in order to produce cathode materials with acceptable electrical conductivities. The doping additives can in this connection be distributed homogeneously in the sense of a mixed crystal in the material or can be present as a separate crystalline phase in addition to the LFP. The doping with transmission metals or also with lanthanoid metals involves high costs for these doping additives per se and in addition requires very complicated and costly methods in order to achieve a distribution and doping that raises the conductivity. Thus, for example, US 2009/0311597 A1 discloses very high calcination temperatures of 800° C. and long calcination times of up to 96 hours, which economically is a serious disadvantage.

US 2009/0152512 A1 describes a material similar to that of US 2009/0311597 A1, though in this case exclusively nanocrystals of metal oxides are discussed, which should be present as separate phases in a cathode material matrix in order thereby to raise the electrical conductivity of the resulting material.

US 2003/0064287 A1 discloses that iron phosphates were intimately mixed with acetylene black in a ratio of 5:1 by means of a dry ball mill for 15 to 120 min (generally 90 min) in order to test the iron phosphates for activity in electrochemical cells. This ratio corresponds to a carbon content of about 17%. In this connection the particle sizes of amorphous, nano-scale iron phosphates should not alter. A crystalline iron phosphate was however comminuted from a mean particle size of about 5 μm to 500 nm. In addition the document assumes that an improved effectiveness of a carbon coating of the iron phosphate particles is achieved by increasing the mixing time. However, it was not demonstrated that a carbon coating of the iron phosphate particles was actually achieved, but was simply assumed.

The addition of extremely fine carbon particles, such as acetylene black, superP (Timcal) or Ketjen Black (Akzo Nobel), or also carbon nanotubes with their extremely special properties, appears relatively simple compared to many other described methods. These special carbons must however in turn be produced by special methods, which restricts their market availability and also makes these materials significantly more expensive compared to say conventional graphites.

A high carbon addition to the active material (cathode material) of a battery in order to achieve the necessary electrical conductivity is not economical, since a battery produced in this way would have to lose potential storage capacity at the expense of the carbon component. It is therefore desirable to achieve a sufficient electrical conductivity with at the same time as low a carbon content as possible. Apart from this the processing of slurries of the cathode material becomes more difficult with increasing carbon content, as is described for example in EP 1 094 532 A1.

BRIEF SUMMARY OF THE INVENTION

The object of the present invention was therefore to provide a method that is simple and cost-effective compared to the prior art for producing iron(III) orthophosphate-carbon composites (FOP/C) with high electrical conductivity combined with as low a carbon content as possible, and also iron(III) orthophosphate-carbon composites produced according to the method.

The object of the invention is achieved by a method for producing an iron(III) orthophosphate-carbon composite that contains iron(III) orthophosphate of the general formular $FePO_4 \cdot nH_2O$ ($n \leq 2.5$), which is characterised in that a carbon source is dispersed in a phosphoric acid aqueous $Fe^{2+}$ ion-containing solution and under addition of an oxidising agent to the dispersion iron(III) orthophosphate-carbon composite is precipitated from the aqueous solution and separated.

BRIEF DESCRIPTION OF THE SEVERAL VIEWS OF THE DRAWINGS

FIG. 1b shows an X-ray diffraction spectrum of the iron(III) orthophosphate of FIG. 1a.

FIG. 2b shows an X-ray diffraction spectrum of the iron(III) orthophosphate of FIG. 2a.

DETAILED DESCRIPTION OF THE INVENTION

In principle any phosphoric acid aqueous $Fe^{2+}$ ion-containing solution can be used for the implementation of the method according to the invention, as long as it contains $Fe^{2+}$ ions in a sufficient concentration so that the precipitation reaction according to the invention takes place. It is however particularly preferred according to the invention to use a phosphoric acid $Fe^{2+}$ solution produced according to DE 10 2009 001 204 A1.

Accordingly, in a particularly preferred embodiment of the process according to the invention the aqueous $Fe^{2+}$ ion-containing solution is prepared by introducing oxidic iron(II), iron(III) or mixed iron(II,III) compounds, selected from hydroxides, oxides, oxide-hydroxides, hydrated oxides, carbonates and hydroxide-carbonates, together with elementary iron into a phosphoric acid-containing aqueous medium and bringing $Fe^{2+}$ ions into solution and reacting $Fe^{3+}$ with elementary Fe (in a comproportionation reaction) and then separating solids from the phosphoric acid aqueous $Fe^{2+}$ solution.

In this preferred embodiment of the method according to the invention the oxidic iron compound and the elementary iron can be used in pulverulent form, preferably with grain sizes D50 in the range from 0.01 μm to 300 μm, and mixed and reacted directly with the phosphoric acid-containing aqueous medium, preferably with dilute phosphoric acid. Alternatively the starting substances or a proportion of the starting substances can first of all be freshly prepared by a precipitation and if necessary subsequent annealing and then processed further as a filter cake. A coloured and/or turbid slurry (black to brown to red) is formed owing to the solids content of the raw material.

When an aqueous solvent is mentioned hereinafter, this not only covers embodiments that contain exclusively water as liquid medium, but also those embodiments in which the liquid medium consists preferably predominently of water, although it can also contain amounts of organic and/or ionic solvents or liquids miscible with water. It is known that such solvent additives can have an influence on the crystal growth and therefore on the resultant morphology of the product.

In the phosporic acid-containing aqueous medium for the preparation of the $Fe^{2+}$ solution a redox reaction takes place between $Fe^{3+}$ from the oxidic iron raw material and the elementary iron, soluble $Fe^{2+}$ being formed in a comproportionation according to the following reaction equation (I).

$$2\ Fe^{3+} + Fe \rightarrow 3\ Fe^{2+} \qquad (I)$$

The temperature of the reaction batch rises by about 2° to 25° C. depending on the raw material if the resultant heat of reaction is not conducted away, which in principle is not necessary. After the end of the reaction the batch is heated to higher temperatures, preferably below 65° C., while stirring, the introduced solids reacting more or less completely, depending on the composition and purity, with the formation of a typically green-coloured $Fe^{2+}$ solution. This process step is completed after about 50 to 120 min. The duration depends inter alia on the employed raw materials and concentrations.

Depending on the purity of the employed solids the solution remains more or less cloudy, which is due to compounds that are insoluble under the reaction conditions. This remaining solids content can be removed by simple filtration, sedimentation, centrifugation or by other suitable means. The weighed-out amounts of these solids vary depending on the choice of the starting substances, acid concentration and reaction temperature employed in the process.

In order to remove further impurities and undesirable substances and compounds from the solution, specific precipitation reagents can advantageously be added to the solution. Thus, for example, the calcium content in the solution can be reduced by the addition of small amounts of sulphuric acid, with the precipitation of calcium sulphate. Furthermore an additional electrolytic precipitation or deposition of undesirable metal ions from the solution can advantageously also be carried out before the carbon source is dispersed in the iron(II) solution, and under the addition of an oxidising agent to the dispersion iron(III) orthophosphate-carbon composite is precipitated from the aqueous solution.

An advantage of preparing the iron(II) solution according to the method described in DE 10 2009 001 204 A1 is that a homogeneous phosphoric acid aqueous iron(II) solution is obtained, from which all impurities present as solids or that can be converted or electrolytically deposited into solids by precipitation additives can be separated by simple means, before the solution is used for the further reaction. Compared to other methods, the method according to the invention allows the production of a product of high purity without subsequently having to carry out particularly complicated purification processes.

In one embodiment of the method according to the invention the reaction of the oxidic iron compounds together with elementary iron in the phosphoric acid-containing aqueous medium is carried out at a temperature in the range from 15° C. to 90° C., preferably in the range from 20° C. to 75° C., particularly preferably in the range from 25° C. to 65° C. If the temperature is too low the reaction rate is slow and possibly uneconomical. With too high a temperature this can lead in some cases to a premature precipitation of iron(III) orthophosphate, inter alia on account of a possible surface reaction on the solid starting substances contained in the suspension. In addition secondary reactions are promoted if the temperature is too high.

In another embodiment of the method according to the invention the carbon source contains elementary carbon. When the description mentions that the carbon source contains elementary carbon and does not consist exclusively of elementary carbon, then the carbon source can contain apart from elementary carbon also carbon compounds, for example in the form of organic compounds, as is also specified hereinafter.

In a particularly preferred embodiment of the method according to the invention the carbon source consists exclusively of elementary carbon, i.e. no additional carbon compounds are added as carbon sources.

Carbon sources according to the invention for elementary carbon are preferably selected from graphite, expanded graphite, soots such as carbon black or smoke black, single-wall or multiwall carbon nanotubes (CNT), fullerenes, graphene, glass carbon (glass-like carbon), carbon fibres, activated charcoal or mixtures thereof.

Due to the addition of suitable carbon sources directly to the $Fe^{2+}$ solution with the formation of a dispersion, the iron(III) orthophosphate together with the material of the carbon source can be precipitated as iron(III) orthophosphate-carbon composite from the solution due to oxidation. The carbon content is freely adjustable through the added amount of carbon source. The iron(III) orthophosphate-carbon composite is suitable as a precursor material for the production of cathode materials. On account of the production according to the invention a cathode material produced from the iron(III) orthophosphate-carbon composite according to the invention has a particularly good conductivity, which in comparable materials according to the prior art can be achieved only with significantly higher carbon contents.

In the preparation of the dispersion of the carbon source in the iron(II) solution, it may be advantageous in order to increase the dispersion stability to finely distribute the carbon source in the solution by the action of mechanical forces. Apart from known methods for the application of high shear forces, the use of wet stirrer ball mills is suitable for this purpose. By using a stirrer ball mill, in addition to the fine distribution of the carbon source its mean particle size or agglomerate size can also be modified. Thus, for example, the mean particle size of a commercially available graphite can be reduced to below 300 nm. The resultant dispersions are for the most part very stable and even after several days scarcely exhibit any tendency to sedimentation of the solid material graphite, even though this generally starts with hydrophobic material properties. The surface of the graphite is possibly modified by the nature of the treatment and/or the content of phosphoric acid and the solid in the dispersion is thereby stabilised. Very stable dispersions of graphite in the iron(II) solution can also be produced if the graphite is first of all hydrophilised and only then introduced into the solution. Methods described in the literature, such as for example by Hummers et al. (J. Am. Chem. Soc.; 1958, 80, 1339), are suitable for this purpose. The graphite is in this connection partially oxidised on the surface. The polarisation resulting therefrom allows significantly stronger interactions with polar solvents, in the present case water.

In a further embodiment of the method according to the invention the carbon source contains apart from elementary carbon also organic compounds. According to the invention organic compounds suitable as carbon sources include hydrocarbons, alcohols, aldehydes, carboxylic acids, surfactants, oligomers, polymers, carbohydrates or mixtures thereof.

In a carbon source comprising a mixture of elementary carbon and an organic compound the organic compound can advantageously promote the fine distribution of the carbon source in the dispersion.

Soluble carbon sources have advantages under the acidic conditions prevailing in the iron(II) solution. Soluble organic carbon sources can adhere partially or completely to the surface of graphite and/or of precipitated FOP and remain to a certain extent in the finished product depending on the intensity of the wash process.

If the carbon source is insoluble or only partially soluble, then its dispersion in the iron(II) solution can be improved, as already described above for sources of elementary carbon, by the action of shear forces.

The addition of surfactant substances to the iron(II) solution can likewise improve the stability of the dispersion. However, when choosing dispersing auxiliaries it should be borne in mind that these can cause a contamination of the product depending on the nature of the additive, which can have a negative effect on the performance of a cathode material subsequently produced from the product of the process, such as for example a reduction of the service life of the battery due to substances that produce undesired secondary reactions during operation of the battery. Conventional ionic compounds (surfactants) are therefore not suitable in this context.

If the carbon source additionally contains organic compounds, then these can be graphitised if the product is subjected to a calcination stage, for example at temperatures of 650°-800° C. Such a calcination stage is however not absolutely essential according to the invention. If organic compounds are added, then according to the invention this takes place in a mixture with elementary, electrically conducting carbon, which then also ensures the electrical conductivity if no calcination stage is carried out. The addition of organic compounds can in addition promote the dispersion of the elementary carbon in the $Fe^{2+}$ solution.

In a preferred embodiment of the method according to the invention the dispersion of the carbon source in the phosphoric acid aqueous $Fe^{2+}$ ion-containing solution contains the carbon source in an amount of 1 to 10 wt. % carbon, preferably 1.5 to 5 wt. % carbon, particularly preferably 1.8 to 4 wt. % carbon, referred to the weight of precipitated FOP.

If the amount of the carbon source in the dispersion is too low, an insufficient electrical conductivity is obtained in the FOP/C. If the amount of the carbon source in the dispersion is too high, potential storage density in the resulting cathode material is lost. This can also lead to problems in the processing of the resultant cathode material when laminating collector foils.

In a further preferred embodiment of the method according to the invention the phosphoric acid aqueous $Fe^{2+}$ ion-containing solution used for the preparation of the dispersion contains the $Fe^{2+}$ ions in a concentration of 0.8 to 2.0 mol/l, preferably 1.0 to 1.7 mol/l, particularly preferably 1.1 to 1.3 mol/l.

If the concentration of the $Fe^{2+}$ ions in the solution is too low, the FOP is not necessarily obtained in the form of phosphosiderite, which is undesirable. If the concentration of the $Fe^{2+}$ ions in the solution is too high, this can have an adverse effect on the stability of the solution and the precipitation of iron(III) orthophosphate.

In a further preferred embodiment of the method according to the invention the phosphoric acid aqueous $Fe^{2+}$ ion-containing solution used for the preparation of the dispersion has a pH in the range from 1.5 to 2.5, preferably 1.8 to 2.3, particularly preferably 2.0 to 2.1.

If the pH of the iron(II) solution is too low, losses of yield in the precipitation of FOP occur due to stabilisation of complex ions. In order to improve the yield, the solution would have to be heated for a longer time after the oxidation. Apart from this, too low a pH value can have a deleterious effect on the modification of the precipitated FOP. If the pH of the iron(II) solution is too high, no pure phosphosiderite can be precipitated.

In a further preferred embodiment of the method according to the invention the oxidising agent that is added to the dispersion is an aqueous solution of hydrogen peroxide ($H_2O_2$), preferably in a concentration of 15 to 50 wt. %, particularly preferably 30 to 40 wt. %.

If the concentration of the oxidising agent is too low this leads locally to a dilution and an increase of the pH during oxidation, which results in the formation of strengite and consequently no pure phophosiderite can be precipitated.

In an alternative embodiment of the method according to the invention the oxidising agent that is added to the dispersion is a gaseous medium selected from air, pure oxygen or ozone, which is blown into the dispersion.

In a further preferred embodiment of the method according to the invention the iron(III) orthophosphate-carbon composite is washed once or several times with water, an aqueous and/or organic solvent after the precipitation and separation from the aqueous solution, and is then dried at elevated temperature and/or under reduced pressure or is available as an aqueous dispersion with a solids content of 1 to 90 wt. %.

The invention also includes an iron(III) orthophosphate-carbon composite, produced by the method according to the invention described herein.

The iron(III) orthophosphate-carbon composite (FOP/C) according to the invention differs in its structure and morphology from other iron(III) orthophosphate-carbon compositions according to the prior art. It exists in the form of small flake-shaped primary crystals. The thickness of the flakes is on average normally about 30 to 40 nm, and in the other two dimensions is conveniently less than 1 μm. Agglomerates of the flakes may be a few micrometres large. The morphology (preferred crystal growth) is confirmed by X-ray diffraction analyses. These analyses reveal for the FOP/C according to the invention significant differences in the measured peak heights (scattering intensity) compared to the theoretically expected peak heights for spherical particles or reference material with a significantly larger flake thickness.

Figure 1A:
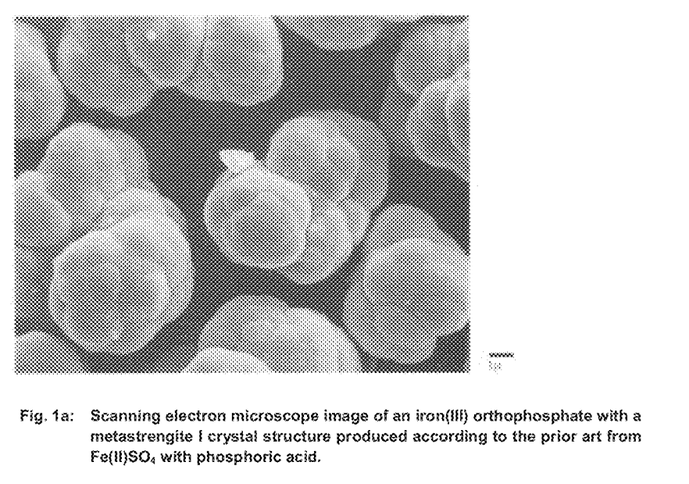
FIG. 1a shows a scanning electron microscope image of an iron(III) orthophosphate with a metastrengite I crystal structure produced according to the prior art from Fe(II)SO4 with phosphoric acid.
Figure 1B:
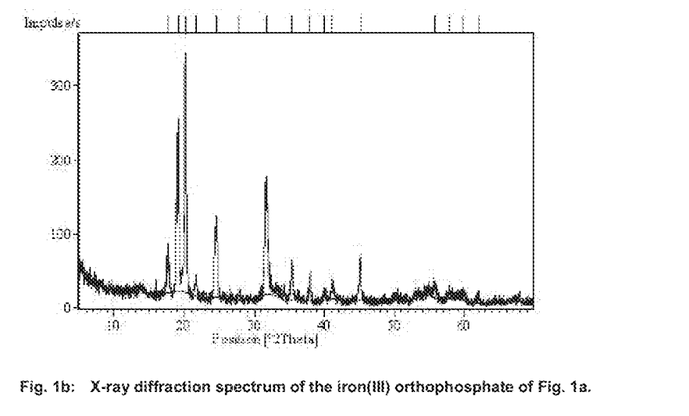
Figure 2A:
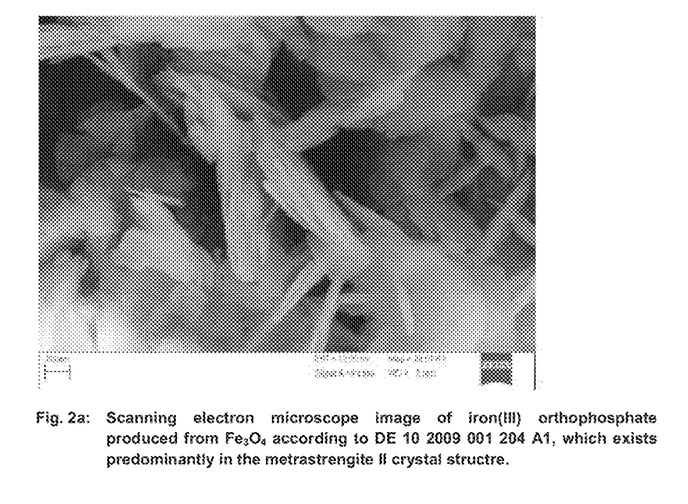
FIG. 2a: Scanning electron microscope image of iron(III) orthophosphate produced from Fe3O4 according to DE 10 2009 001 204 A1, which exists predominantly in the metrastrengite II crystal structure.
Figure 2B:
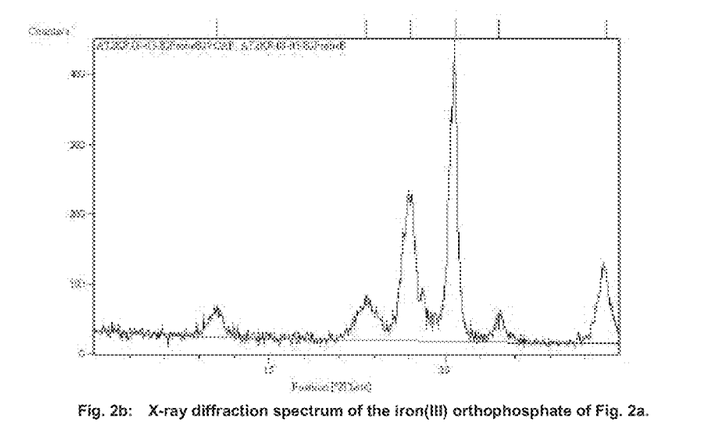
Figure 3A:
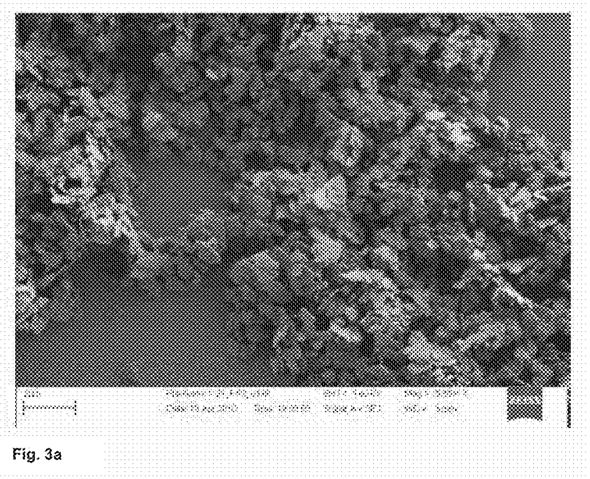
FIG. 3a shows a scanning electron microscope image of iron(III) orthophosphate-carbon composite at a magnification of 5.35K×. Particles of FOP and graphite cannot be differentiated. The sample was prepared from a washed filter cake of FOP/C by dispersion in H2O.
Figure 3B:
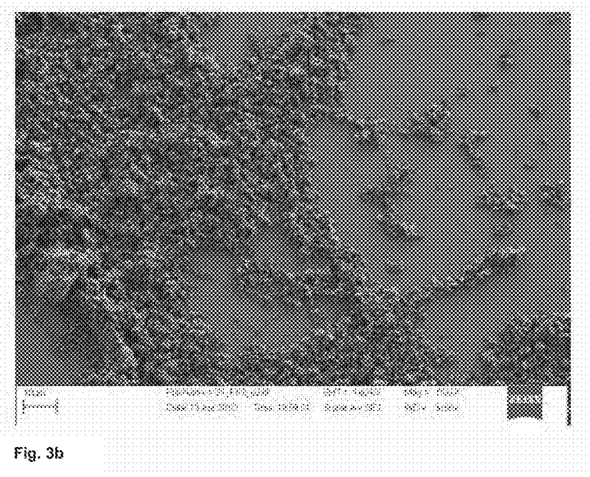
FIG. 3b shows a scanning electron microscope image of iron(III) orthophosphate-carbon composite at a magnification of 690×. Particles of FOP and graphite cannot be differentiated. The sample was prepared from a washed filter cake of FOP/C by dispersion in H2O.
Figure 3C:
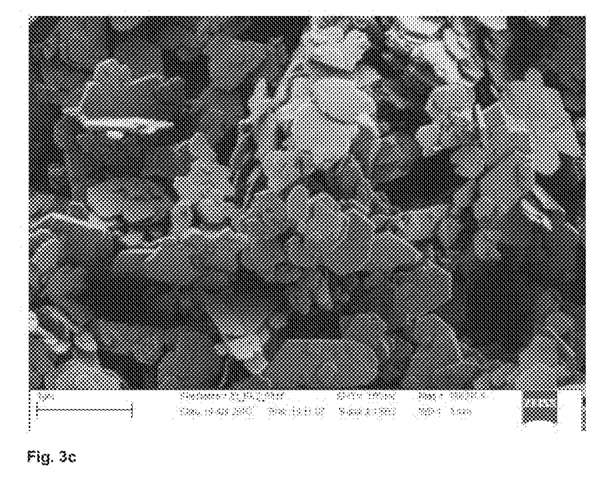
FIG. 3c shows a scanning electron microscope image of iron(III) orthophosphate-carbon composite at a magnification of 19.62K×. Particles of FOP and graphite cannot be differentiated. The sample was prepared from a washed filter cake of FOP/C by dispersion in H2O.
Figure 3D:
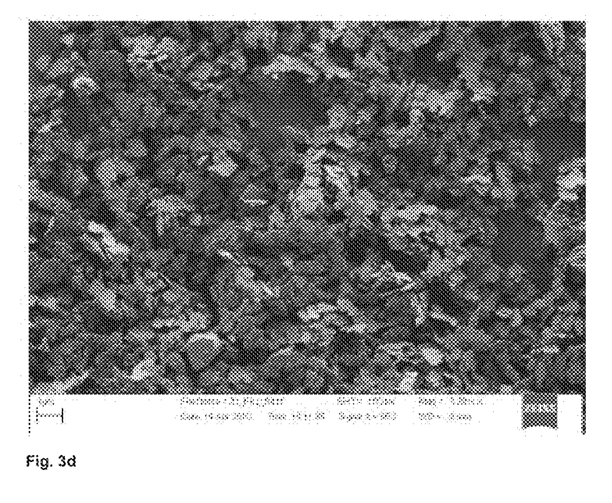
FIG. 3d shows a scanning electron microscope image of iron(III) orthophosphate-carbon composite at a magnification of 9.00K×. Particles of FOP and graphite cannot be differentiated. The sample was prepared from a washed filter cake of FOP/C by dispersion in H2O.
Figure 3E:
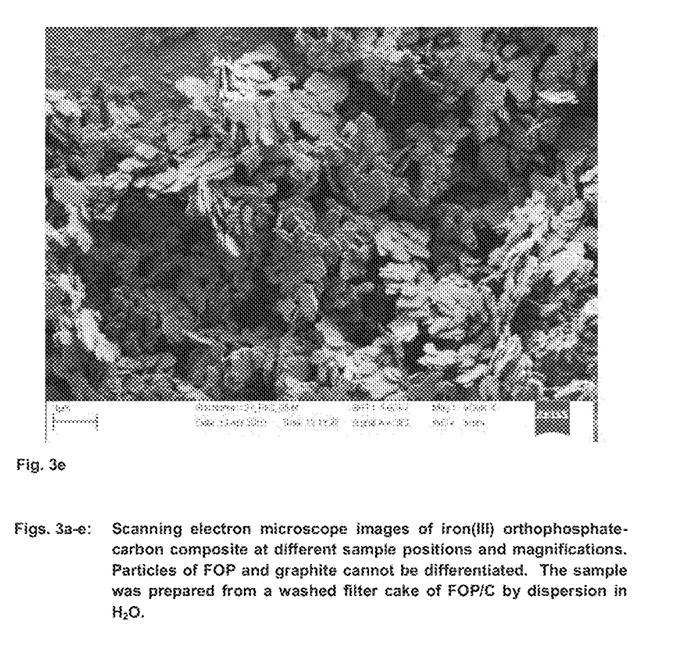
FIG. 3e shows a scanning electron microscope image of iron(III) orthophosphate-carbon composite at a magnification of 5.35K×. Particles of FOP and graphite cannot be differentiated. The sample was prepared from a washed filter cake of FOP/C by dispersion in H2O.
Figure 4:
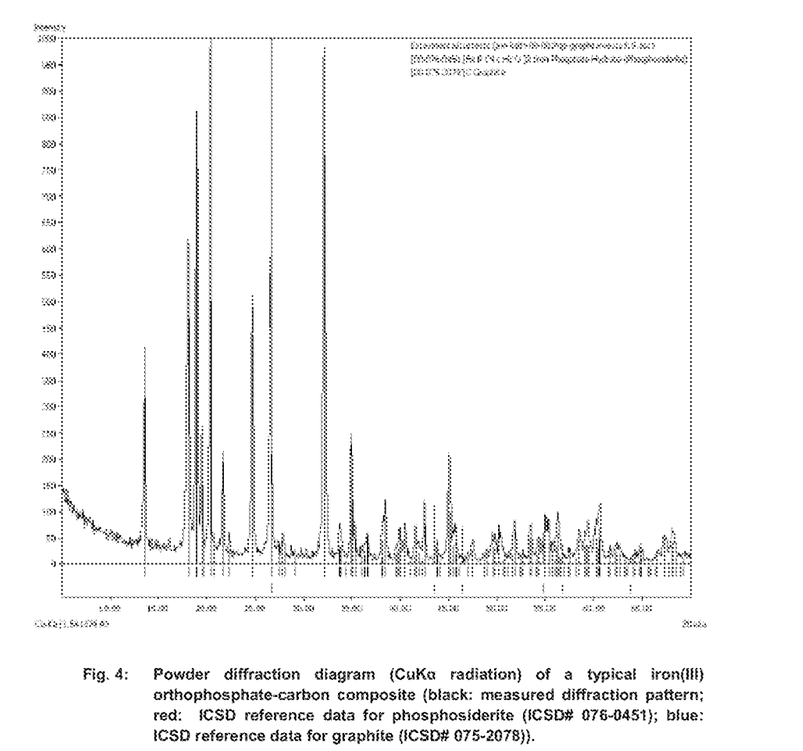
FIG. 4 shows a powder diffraction diagram (CuKα radiation) of a typical iron(III) orthophosphate-carbon composite (black: measured diffraction pattern; red: ICSD reference data for phosphosiderite (ICSD#076-0451); blue: ICSD reference data for graphite (ICSD#075-2078)).
Figure 5:
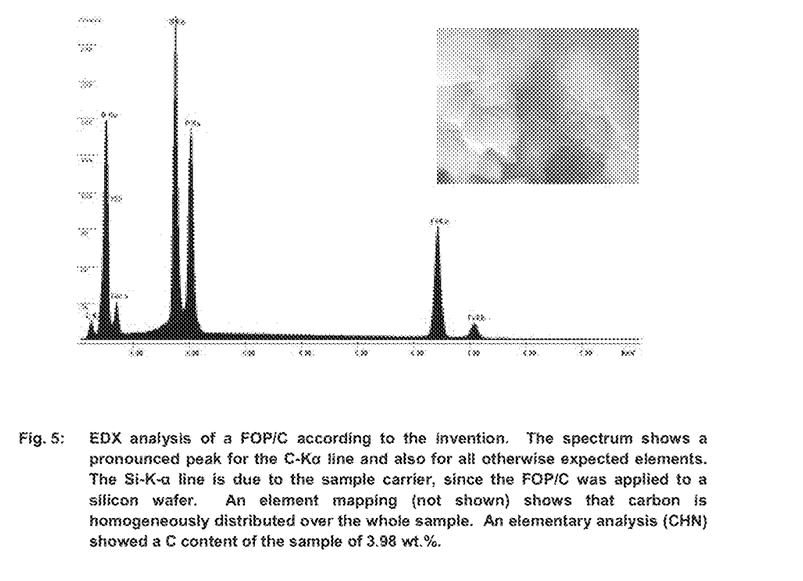
FIG. 5 shows EDX analysis of a FOP/C according to the invention. The spectrum shows a pronounced peak for the C—Kα line and also for all otherwise expected elements. The Si—K-α line is due to the sample carrier, since the FOP/C was applied to a silicon wafer. An element mapping (not shown) shows that carbon is homogeneously distributed over the whole sample. An elementary analysis (CHN) showed a C content of the sample of 3.98 wt. %.

FIG. 5 shows an EDX analysis (energy dispersive X-ray analysis) of a FOP/C according to the invention. The spectrum shows a pronounced peak for the C—Kα line as well as for all otherwise expected elements. The Si—Kα line is due to the sample carrier, since the FOP/C was applied to a silicon wafer. An element mapping (not shown) shows that carbon is homogeneously distributed over the whole sample. An elementary analysis (CHN) gave a C content of the sample of 3.98 wt. %.

Figure 6:
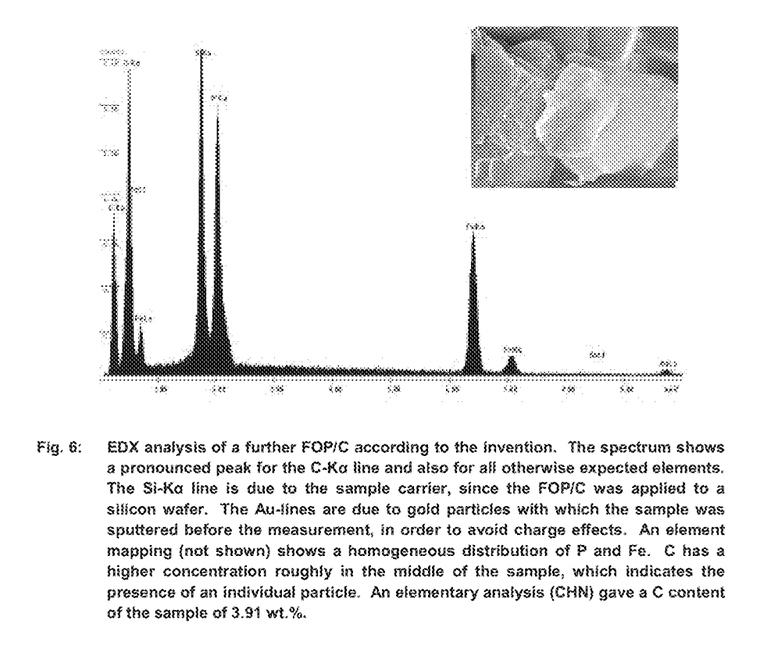
FIG. 6 shows EDX analysis of a further FOP/C according to the invention. The spectrum shows a pronounced peak for the C—Kα line and also for all otherwise expected elements. The Si—Kα line is due to the sample carrier, since the FOP/C was applied to a silicon wafer. The Au-lines are due to gold particles with which the sample was sputtered before the measurement, in order to avoid charge effects. An element mapping (not shown) shows a homogeneous distribution of P and Fe. C has a higher concentration roughly in the middle of the sample, which indicates the presence of an individual particle. An elementary analysis (CHN) gave a C content of the sample of 3.91 wt. %.

FIG. 6 shows an EDX analysis of a further FOP/C according to the invention. The spectrum shows a pronounced peak for the C—Kα line as well as for all otherwise expected elements. the Si—Kα line is due to the sample carrier, since the FOP/C was supported on a silicon wafer. The Au-lines are due to gold particles with which the sample was sputtered before the measurement, in order to avoid charge effects. An element mapping (not shown) shows a homogenous distribution of P and Fe. C has a higher concentration roughly in the middle of the sample, which indicates the presence of an individual particle. An elementary analysis (CHN) gave a C content of the sample of 3.91 wt. %.

The results of the EDX analyses of the FOP/C according to the invention correlate with the desired and the adjusted carbon contents in the synthesis. The specific surfaces (measured according to the BET method) of the FOP/C according to the invention are normally >10 m$^2$/g, preferably >15 m$^2$/g, more preferably >18 m$^2$/g and particularly preferably >22 m$^2$/g.

In a preferred embodiment of the invention >80 wt. %, preferably >90 wt. %, and particularly preferably >95 wt. % of the iron(III) orthophosphate-carbon composite is present in the metastrengite II (phosphosiderite) crystal structure.

In a further preferred embodiment of the invention the iron(III) orthophosphate-carbon composite has at least in one dimension a mean primary particle size <1 μm, preferably <500 nm, particularly preferable <300 nm and most particularly preferably <100 nm.

In a further preferred embodiment of the invention the iron(III) orthophosphate-carbon composite has a bulk density >400 g/l, preferably >700 g/l, particularly preferably >1000 g/l and/or a compacted bulk density >600 g/l, preferably >750 g/l, particularly preferably >1100 g/l.

The invention also includes the use of iron(III) orthophosphate-carbon composite according to the invention for the production of LiFePO$_4$ cathode material for Li-ion batteries.

The invention furthermore includes LiFePO$_4$ cathode material for Li-ion batteries, produced using iron(III) orthophosphate-carbon composite according to the invention.

The invention in addition includes a Li-ion battery comprising a LiFePO$_4$ cathode material according to the invention.

EXAMPLES

Preparation of the Employed Iron(II) Solution

The preparation of the employed phosphoric acid Fe$^{2+}$ solution was carried out according to DE 10 2009 001 204 A1. For this, 1875 g of 75% H$_3$PO$_4$ were diluted with double the amount of water. 105 g of elementary iron and 300 g of magnetite (Fe$_3$O$_4$) were added to the solution, causing the temperature of the solution to rise. After the exothermic effect had ceased the solution was stirred at 60° C. for 2 hrs and then separated from possible suspended substances. The solution contained 0.956 mol Fe$^{2+}$ per kg solution and 2.380 mol PO$_4^{3-}$ per kg solution.

Determination of the Electrical Conductivity

To determine the electrical conductivity of products according to the invention and comparison products, compacted bodies, so-called mouldings, such as are also used for spectroscopic investigations, were produced with a commercially available compression mould. The method is one known to the person skilled in the art. The diameter of the mouldings was 12 mm, predetermined by the compression mould. The thickness of the mouldings was about 2 to 4 mm, depending on the pressed amount of sample, and was determined with a micrometer screw gauge.

Using a commercially available multifunction measuring device (Voltcraft® Digitalmultimeter M-4660) with integrated current and voltage source, the electrical resistance through the test body was measured by carefully pressing the measuring electrodes on (i) opposite positions of a surface of the mouldings and (ii) on the two opposite surfaces.

Example 1

Production of an Iron(III) Orthophosphate-Carbon Composite (FOP/C) with 7.3% Graphite 2540 g (ca. 2 L) of Fe$^{2+}$ solution were added to a mixing vessel and pumped in a circular motion with an agitator ball mill (LabStar, Fa. Netzsch), equipped with 0.4-0.6 mm size milling balls. 33.1 g of graphite (UF2 from Fa. Graphitwerk Kropfmühl KG) were then added in 4 portions within 5 min. The particle size distribution and quality of the dispersion was checked every 30 min by means of a DLS measurement (dynamic light scattering, Malvern Zetasizer). After 3 hrs there was no change compared to the two previous measurements. The experiment was terminated and the dispersion was collected in a test beaker.

1100 g of the dispersion were heated to 75° C. and 110 ml of H$_2$O$_2$ (35% in water) were then added while stirring, in order to initiate the precipitation of FOP. After the end of the resultant evolution of gas the mixture was stirred for a further 15 min at 85° C. The solids fraction of the mixture was separated with a suction filter and then resuspended twice, each time in 1 L of deionised water and filtered. After drying in a circulating air drying cabinet at 100° C. 182 g of a grey solid were obtained. The X-ray diffraction analysis of the product showed the characteristic reflections for phosphosiderite and graphite.

Example 2

Preparation of an Iron(III) Orthophosphate-Carbon Composite (FOP/C) with 7.3% Expanded Graphite 3367 g (ca. 2.6 L) of Fe$^{2+}$ solution were added to a mixing vessel and pumped in a circular motion with an agitator ball mill (LabStar, Fa. Netzsch), equipped with 0.4-0.6 mm size milling balls. 43.9 g of expanded graphite (Fa. SGL Carbon) were then added in 4 portions within 5 min. After 2 hrs the dispersion was collected in a test beaker.

1500 g of the dispersion were heated to 75° C. and 160 ml of H$_2$O$_2$ (35% in water) were then added while stirring, in order to initiate the precipitation of FOP. After the end of the resultant evolution of gas the mixture was stirred for a further 15 min at 85° C. The solids fraction of the mixture was separated with a suction filter and then resuspended twice, each time in 1.5 L of deionised water and filtered. After drying in a circulating air drying cabinet at 100° C. 273 g of a grey solid were obtained. The X-ray diffraction analysis of the product showed the characteristic reflections for phosphosiderite and graphite.

Example 3

Preparation of an Iron(III) Orthophosphate-Carbon Composite (FOP/C) with 4% Pretreated Graphite Before the suspension in the ball mill, about 30 g of graphite (Fa. SGL Carbon) in 500 ml conc. $HNO_3$ were boiled under reflux for 1.5 hr. The solid material was then separated using a suction filter, resuspended twice in each case in 1 L of deionised water, filtered and dried overnight in a circulating air drying cabinet at 100° C. 13.2 g of the graphite treated in this way were added in 4 portions within 5 min to 1850 g (ca. 2 L) of $Fe^{2+}$ solution, while pumping the solution in a circular motion with an agitator ball mill (Labstar. Fa. Netzsch) equipped with 0.4-0.6 mm size milling balls. After 2 hrs the dispersion was collected in a test beaker.

800 g of the dispersion were heated to 75° C. and 110 ml of $H_2O_2$ (35% in water) were then added while stirring, in order to initiate the precipitation of FOP. After the end of the resultant evolution of gas the mixture was stirred for a further 15 min at 85° C. The solids fraction of the mixture was separated with a suction filter and then resuspended twice, each time in 1 L of deionised water and filtered. After drying in a circulating air drying cabinet at 100° C. 133 g of a grey solid were obtained. The X-ray diffraction analysis of the product showed the characteristic reflections for phosphosiderite and graphite.

Example 4

Preparation of an Iron(III) Orthophosphate-Carbon Composite (FOP/C) with 2.3% Ketjen Black 23 g of Ketjen Black® EC-300J (Fa. Akzo Nobel) were added in portions within 15 min to 5600 g (ca. 4.5 L) of a $Fe^{2+}$ solution. Following this the solution was then pumped in a circular motion with an agitator ball mill (LabStar. Fa. Netzsch), equipped with 0.8-1.0 mm size milling ball. After 3 hr the dispersion was collected in a test beaker.

3.8 kg of the dispersion were heated to 75° C. and 390 ml of $H_2O_2$ (35% in water) were then added while stirring, in order to initiate the precipitation of FOP. After the end of the resultant evolution of gas the mixture was stirred for a further 15 min at 85° C. The solids fraction of the mixture was separated with a suction filter and then resuspended twice, each time in 1 L of deionised water and filtered. After drying in a circulating air drying cabinet at 100° C. 850 g of a light grey solid were obtained. The X-ray diffraction analysis of the product showed the characteristic reflections for phosphosiderite and graphite.

Comparison Examples 1000 g of iron(III) orthophosphate (FOP) were prepared according to DE 10 2009 001 204 A1 using the $Fe^{2+}$ solution described above and also used for the Examples according to the invention. As above, $H_2O_2$ (35% in water) was used for the oxidation reaction. In each case 100 g of the obtained iron(III) orthophosphate were ground with the following carbons A) to H) in a pestle mill (Retsch RM100) for 90 min in each case.

A) 2.3% Ketjen Black® EC-300J (Fa. Azko Nobel)
B) 3% Ketjen Black® EC-300J (Fa. Azko Nobel)
C) 5% Ketjen Black® EC-300J (Fa. Azko Nobel)
D) 9% Ketjen Black® EC-300J (Fa. Azko Nobel)
E) 5% Expanded Graphite (Fa. SGL)
F) 9% Expanded Graphite (Fa. SGL)
G) 5% Graphite (UF2 from Fa. Graphitwerk Kropfmühl KG)
H) 9% Graphite (UF2 from Fa. Graphitwerk Kropfmühl KG)

Resistance and Conductivity Measurements

Mouldings were produced from the products of the examples according to the invention and from the comparison examples, and resistance and conductivity measurements were carried out on these. The results are shown in the following Table 1.

TABLE 1

Results of the resistance and conductivity measurements on mouldings of products of Examples 1 to 4 according to the invention and of comparison examples A to H

| Sample | Carbon source | Carbon content referred to FOP | Moulding thickness [cm] | Surface resistance [Ω] | Sheet resistance [$\rho_F$/Ω] | Specific conductivity [σ/S m$^{-1}$] |
|---|---|---|---|---|---|---|
| 1 | Graphite | 7.3% | 0.167 | 1850 | 1850 | 3.24E−01 |
| 2 | Expanded Graphite | 7.3% | 0.451 | 12 | 1.15E+01 | 1.93E+01 |
| 3 | Graphite hydrophilised | 4.0% | 0.144 | 4340 | 4.34E+03 | 1.60E−01 |
| 4 | Ketjen Black | 2.3% | 0.148 | 5200 | 5.20E+03 | 1.30E−01 |
| A | Ketjen Black | 2.3% | 0.082 | 18000 | 1.80E+04 | 6.78E−02 |
| B | Ketjen Black | 3% | 0.198 | 180 | 1.80E+02 | 2.81E+00 |
| C | Ketjen Black | 5% | 0.189 | 60 | 6.00E+01 | 8.82E+00 |
| D | Ketjen Black | 9% | 0.214 | 23 | 2.30E+01 | 2.03E+01 |
| E | Expanded Graphite | 5% | 0.164 | 4000000 | 4.00E+06 | 1.52E−04 |
| F | Expanded Graphite | 9% | 0.144 | 3200000 | 3.20E+06 | 2.17E−04 |
| G | Graphite | 5% | 0.072 | 19000000 | 1.90E+07 | 7.31E−05 |
| H | Graphite | 9% | not det.. | not det. | not det. | not det. |

No moulding could be produced from comparison Example H, because the graphite content was so high that in all attempts to produce a moulding, this disintegrated when removed from the mold.

The results show that when using various graphites the conductivities of iron(III) orthophosphate-carbon composites according to the invention compared to the comparison examples that had been produced by conventional methods of the prior art, were higher by orders of magnitude of at least 1000-10000. When using the carbon Ketjen Black specially developed for such a use the measured conductivity compared to the comparison example was half that of the example according to the invention.

The present invention thus enables electrically conducting iron(III) orthophosphate-carbon composites to be produced in a very simple way and far more economically and ecologically friendly compared to carbons such as Ketjen Black specially developed for such a use, as starting materials for the production of cathode material. The use of natural graphites is considerably more cost-effective compared to synthetic nanoparticles obtained from thermal processes.

If the carbon content of the iron(III) orthophosphate-carbon composites is to be reduced as far as possible and at the same time a high conductivity is to be obtained, then special carbons such as Ketjen Black are particularly advantageous. Compared to purely physical mixing according to literature methods, here an iron(III) orthophosphate-carbon composite was obtained with significantly less carbon black, and has a comparable or better conductivity.

The hydrophilisation of the carbon component before the addition to the $Fe^{2+}$ solution has a particularly advantageous effect. The results show that, despite a reduction of the carbon content by nearly half, comparable conductivities can be obtained as in the case of non-hydrophilised carbon.

The iron(III) orthophosphate-carbon composites according to the invention open up the possibility of reducing the calcination temperature to below 650° C. in the production of $LiFePO_4$ cathode material, since no carbonisation of a carbon precursor compounds is necessary in order to achieve corresponding conductivities. This can in turn be utilised to monitor the particle size distribution and the morphology of a cathode material in a far more flexible manner than known hitherto, which has a direct effect on the electrochemical performance of the cathode material.

What is claimed is:

1. A method for the production of an iron(III) orthophosphate-carbon composite that contains iron(III) orthophosphate-carbon composite that contains iron(III) orthophosphate of the general formula $FePO_4 \times nH_2O$ (n<2.5) comprising: dispersing a carbon source in a phosphoric acid aqueous $Fe^{2+}$ ion-containing aqueous solution to obtain a dispersion, wherein the aqueous $Fe^{2+}$ ion-containing solution is prepared by adding iron(II), iron(III) or mixed iron(II,III) compounds, selected from the group consisting of hydroxides, oxides, oxide-hydroxides, hydrated oxides, carbonates, hydroxide carbonates and mixtures thereof, together with elementary iron, to a phosphoric acid-containing aqueous medium to bring $Fe^{2+}$ ions into solution and to convert $Fe^{3+}$ with the elementary Fe, by a comproportionation reaction, to $Fe^{2+}$ and then separating solids from the phosphoric acid aqueous $Fe^{2+}$ solution, adding an oxidizing agent to the dispersion to precipitate the iron(III) orthophosphate-carbon composite from the aqueous solution, and separating the iron(III) orthophosphate-carbon composite precipitate from the aqueous solution, wherein the iron(III) orthophosphate-carbon composite contains iron(III) orthophosphate of the general formula $FePO_4 \times nH_2O$ (n<2.5).

2. A method according to claim 1 wherein the aqueous $Fe^{2+}$ ion-containing solution is prepared by adding iron(II), iron(III) or mixed iron(II,III) compounds, selected from the group consisting of hydroxides, oxides, oxide-hydroxides, hydrated oxides, carbonates, hydroxide carbonates and mixtures thereof, together with elementary iron, to a phosphoric acid-containing aqueous medium to bring $Fe^{2+}$ ions into solution and to convert $Fe^{3+}$ with the elementary Fe, by a comproportionation reaction, to $Fe^{2+}$ and then separating solids from the phosphoric acid aqueous $Fe^{2+}$ solution.

3. A method according to claim 1 wherein the carbon source comprises elementary carbon selected from the group consisting of graphite, expanded graphite, soots, carbon black, smoke black carbon nanotubes (CNT), fullerenes, graphene, glassy carbon, carbon fibres, activated charcoal and mixtures thereof.

4. A method according to claim 1 wherein the carbon source is elementary carbon and carbon compound.

5. A method according to claim 1 wherein the carbon source comprises elementary carbon and organic carbon compound selected from the group consisting of hydrocarbons, alcohols, aldehydes, carboxylic acids, surfactants, oligomers, polymers, carbohydrates and mixtures thereof.

6. A method according to claim 1 wherein the dispersion of the carbon source in the phosphoric acid aqueous $Fe^{2+}$ ion-containing solution contains the carbon source in an amount of 1 to 10 wt. % carbon by weight of precipitated iron(III) orthophosphate.

7. A method according to claim 1 wherein the dispersion of the carbon source in the phosphoric acid aqueous $Fe^{2+}$ ion-containing solution contains the carbon source in an amount of 1.5 to 5 wt. % carbon by weight of precipitated iron(III) orthophosphate.

8. A method according to claim 1 wherein the dispersion of the carbon source in the phosphoric acid aqueous $Fe^{2+}$ ion-containing solution contains the carbon source in an amount of 1.8 to 4 wt. % carbon by weight of precipitated iron(III) orthophosphate.

9. A method of claim 6 wherein the carbon source is an electrically conductive carbon source.

10. A method according to claim 1 wherein the phosphoric acid aqueous $Fe^{2+}$ ion-containing solution used for the preparation of the dispersion contains the $Fe^{2+}$ ions in a concentration of 0.8 to 2.0 mol/l.

11. A method according to claim 1 wherein the phosphoric acid aqueous $Fe^{2+}$ ion-containing solution used for the preparation of the dispersion contains the $Fe^{2+}$ ions in a concentration of 1.0 to 1.7 mol/l.

12. A method according to claim 1 wherein the phosphoric acid aqueous $Fe^{2+}$ ion-containing solution used for the preparation of the dispersion
    n contains the $Fe^{2+}$ ions in a concentration of 1.1 to 1.3 mol/l.

13. A method according to claim 1 wherein the phosphoric acid aqueous $Fe^{2+}$ ion-containing solution used for the preparation of the dispersion has a pH in the range from 1.5 to 2.5.

14. A method according to claim 1 wherein the phosphoric acid aqueous $Fe^{2+}$ ion-containing solution used for the preparation of the dispersion has a pH in the range from 1.8 to 2.3.

15. A method according to claim 1 wherein the phosphoric acid aqueous $Fe^{2+}$ ion-containing solution used for the preparation of the dispersion has a pH in the range from 2.0 to 2.1.

16. A method according to claim 1 wherein the oxidizing agent that is added to the dispersion is an aqueous solution of hydrogen peroxide, air, oxygen or ozone.

17. A method according to claim 1 wherein the iron(III) orthophosphate-carbon composite is washed after the precipitation and separation of the aqueous solution.

18. A method according to claim 17 wherein the washed precipitate is dried.

19. A method according to claim 17 wherein the washed precipitate is dispersed in an aqueous liquid with solids content of 1 to 90 weight percent.

20. Iron(III) orthophosphate-carbon composite produced according to a method comprising:
dispersing a carbon source in a phosphoric acid aqueous $Fe^{2+}$ ion-containing aqueous solution to obtain a dispersion, wherein the aqueous $Fe^{2+}$ ion-containing solution is prepared by adding iron (II), iron (III) or mixed iron (II,III) compounds, selected from the group consisting of hydroxides, oxides, oxide-hydroxides, hydrated oxides, carbonates, hydroxide carbonates and mixtures thereof, together with elementary iron, to a phosphoric acid-containing aqueous medium to bring $Fe^{2+}$ ions into solution and to convert $Fe^{3+}$ with the elementary Fe, by a comproportionation reaction, to $Fe^{2+}$ and then separating solids from the phosphoric acid aqueous $Fe^{2+}$ solution,
adding an oxidizing agent to the dispersion to precipitate the iron(III) orthophosphate-carbon composite from the aqueous solution, and
separating the iron(III) orthophosphate-carbon composite precipitate from the aqueous solution,
wherein the iron(III) orthophosphate-carbon composite contains iron(III) orthophosphate of the general formula $FePO_4 \times nH_2O$ ($n \leq 2.5$).

21. Iron(III) orthophosphate-carbon composite produced according to the method of claim 20 wherein the dispersion of the carbon source in the phosphoric acid aqueous $Fe^{2+}$ ion-containing solution contains the carbon source in an amount of 1.5 to 5 wt. % carbon by weight of precipitated iron(III) orthophosphate.

22. An Iron(III) orthophosphate-carbon composite produced according to the method of claim 20 containing from 1.5 to 5 weight percent of electrically conductive carbon wherein greater than 80 weight percent is present in the metastrengite II crystal structure.

23. Iron(III) orthophosphate-carbon composite according to claim 20 wherein greater than 90 weight percent is present in the metastrengite II crystal structure.

24. Iron(III) orthophosphate-carbon composite according to claim 20 wherein greater than 80 weight percent is present in the metastrengite II crystal structure.

25. Iron(III) orthophosphate-carbon composite according to claim 20 wherein the iron(III) orthophosphate-carbon composite has a mean particle size of less than 500 nm in at least one dimension.

26. Iron(III) orthophosphate-carbon composite according to claim 20 wherein the iron(III) orthophosphate-carbon composite has a mean particle size of less than 300 nm in at least one dimension.

27. Iron(III) orthophosphate-carbon composite according to claim 20 wherein the iron(III) orthophosphate-carbon composite has a mean particle size of less than 100 nm in at least one dimension.

28. Iron(III) orthophosphate-carbon composite according to claim 20 wherein it has a bulk density >400 g/l.

29. Iron(III) orthophosphate-carbon composite according to claim 20 wherein it has a bulk density >700 g/l.

30. Iron(III) orthophosphate-carbon composite according to claim 20 wherein it has a bulk density >1000 g/l.

31. Iron(III) orthophosphate-carbon composite according to claim 20 wherein it has a compacted bulk density >600 g/l.

32. Iron(III) orthophosphate-carbon composite according to claim 20 wherein it has a compacted bulk density >750 g/l.

33. Iron(III) orthophosphate-carbon composite according to claim 20 wherein it has a compacted bulk density >1100 g/l.

34. A method for producing $LiFePO_4$ carbon composite material by converting iron(III) orthophosphate-carbon composite of claim 20.

35. A $LiFePO_4$ cathode material for Li-ion batteries, produced using iron(III) orthophosphate-carbon composite of claim 20.

36. A Li-ion battery, containing a $LiFePO_4$ cathode material according to claim 35.

* * * * *